United States Patent
Rodriguez Bravo et al.

(10) Patent No.: US 11,776,255 B2
(45) Date of Patent: Oct. 3, 2023

(54) DYNAMIC INPUT SYSTEM FOR SMART GLASSES BASED ON USER AVAILABILITY STATES

(71) Applicant: KYNDRYL, INC., New York, NY (US)

(72) Inventors: Cesar Augusto Rodriguez Bravo, Alajuela (CR); David Alonso Campos Batista, Heredia (CR); Sarbajit K. Rakshit, Kolkata (IN); Diane G. Flemming, Pflugerville, TX (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/508,005

(22) Filed: Oct. 22, 2021

(65) Prior Publication Data

US 2023/0125416 A1 Apr. 27, 2023

(51) Int. Cl.
| | |
|---|---|
| *G06V 20/20* | (2022.01) |
| *G06F 3/01* | (2006.01) |
| *G02B 27/01* | (2006.01) |
| *G06T 19/00* | (2011.01) |
| *G06N 20/00* | (2019.01) |

(Continued)

(52) U.S. Cl.
CPC ......... *G06V 20/20* (2022.01); *G02B 27/0101* (2013.01); *G02B 27/0172* (2013.01); *G06F 3/011* (2013.01); *G06F 3/017* (2013.01); *G06N 20/00* (2019.01); *G06T 19/006* (2013.01); *G06V 40/107* (2022.01); *G06V 40/28* (2022.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | |
|---|---|---|
| 2011/0304550 A1 | 12/2011 | Romera Jolliff et al. |
| 2013/0044128 A1 | 2/2013 | Liu et al. |

(Continued)

OTHER PUBLICATIONS

Andrew, "15 Free jQuery Plugins for Creating Dynamic Layouts", https://speckyboy.com/15-jquery-plugins-for-creating-dynamic-layouts/, Speckyboy, May 15, 2020, 10 pages.

(Continued)

*Primary Examiner* — Tapas Mazumder
(74) *Attorney, Agent, or Firm* — Dan Housley; Andrew M. Calderon; Calderon Safran & Cole, P.C.

(57) ABSTRACT

A dynamic user interface (UI) input system and method for smart glasses based on availability states of a user is provided. In embodiments, a method includes determining, by a computing device of smart glasses, an initial availability state of a user's hands for a user interface (UI) navigation event based on incoming image data; selecting, by the computing device, a UI configuration and a control profile for the UI navigation event from stored UI configurations and control profiles of the user based on the initial availability state of the user's hands; and initiating, by the computing device, the UI navigation event based on the selected UI configuration and the control profile, wherein content is displayed in a virtual UI of the smart glasses according to the UI configuration, and UI navigation by the user is controlled based on the control profile.

20 Claims, 9 Drawing Sheets

(51) Int. Cl.
*G06V 40/20* (2022.01)
*G06V 40/10* (2022.01)

(56) References Cited

U.S. PATENT DOCUMENTS

| | | |
|---|---|---|
| 2013/0278504 A1 | 10/2013 | Tong et al. |
| 2014/0101608 A1 | 4/2014 | Ryskamp et al. |
| 2016/0109954 A1* | 4/2016 | Harris .................... G06V 20/20 345/156 |
| 2016/0246384 A1* | 8/2016 | Mullins ................... G06F 3/017 |
| 2016/0342203 A1 | 11/2016 | Schwesinger et al. |
| 2017/0161448 A1* | 6/2017 | Fram ....................... A61B 90/36 |
| 2020/0344195 A1* | 10/2020 | Jang ........................ H04L 51/18 |

OTHER PUBLICATIONS

Anonymous, "What is . . . Dynamic content", https://www.omniconvert.com/what-is/dynamic-content, Omniconvert, Jun. 11, 2019, 8 pages.

Anonymous, "EZ Keys Software", http://www.techaccess4you.com/ez-keys-software/, Technology Access INC, accessed Oct. 19, 2021, 2 pages.

Anonymous, "Homepage ACAT", https://01.org/acat, ACAT, accessed Oct. 19, 2021, 3 pages.

Anonymous, "Build a Dashboard for Monitoring IoT Data with Initial State", https://www.pubnub.com/blog/build-realtime-iot-dashboard-for-monitoring-iot-data-with-initial-state/, PubNub, Mar. 22, 2017, 22 pages.

Verma, "Creating Dynamic Layouts in Android", https://medium.com/mindorks/creating-dynamic-layouts-in-android-d4008b72f2d, MindOrks, May 16, 2018, 7 pages.

Medjden et al., "Adaptive user interface design and analysis using emotion recognition through facial expressions and body posture from an RGB-D sensor", https://doi.org/10.1371/journal.pone.0235908, Plos One, Jul. 16, 2020, 19 pages.

Mell et al., "The NIST Definition of Cloud Computing", NIST, Sep. 2011, 7 pages.

* cited by examiner

DYNAMIC INPUT SYSTEM FOR SMART GLASSES BASED ON USER AVAILABILITY STATES

BACKGROUND

Aspects of the present invention relate generally to user interfaces (UI) and, more particularly, to a dynamic UI input system for smart glasses based on availability states of a user.

Gesture recognition systems enable users to utilize hand gestures to initiate user commands for a virtual user interface. User interface systems exist that dynamically adjust content based on certain conditions, such as a distance of a user from a camera of a device. Augmented reality (AR) systems exist which provide users with an interactive experience where objects in the real world are enhanced with computer-generated perceptual information. Some smart glasses provide users with displays (e.g., a heads-up display) enabling augmented reality functions and gesture-based UI commands.

SUMMARY

In a first aspect of the invention, there is a computer-implemented method including: determining, by a computing device of smart glasses, an initial availability state of a user's hands for a user interface (UI) navigation event based on incoming image data; selecting, by the computing device, a UI configuration and a control profile for the UI navigation event from stored UI configurations and control profiles of the user based on the initial availability state of the user's hands; and initiating, by the computing device, the UI navigation event based on the selected UI configuration and the control profile, wherein content is displayed in a virtual UI of the smart glasses according to the UI configuration, and UI navigation by the user is controlled based on the control profile.

In another aspect of the invention, there is a computer program product including one or more computer readable storage media having program instructions collectively stored on the one or more computer readable storage media. The program instructions are executable to cause a computing device of smart glasses to: determine an initial availability state of a user for a user interface (UI) navigation event based on incoming image data, wherein the initial availability state indicates a level of availability of a user's hands to perform gesture-based UI navigation; select a UI configuration and a control profile for the UI navigation event from stored customized UI configurations and control profiles of the user based on the initial availability state of the user; and initiate the UI navigation event based on the selected UI configuration and the control profile, wherein content is displayed in a virtual UI of the smart glasses according to the UI configuration, and UI navigation by the user is controlled based on the control profile.

In another aspect of the invention, there is system including a processor, a computer readable memory, one or more computer readable storage media, and program instructions collectively stored on the one or more computer readable storage media. The program instructions are executable to cause a computing device of smart glasses to: determine an initial availability state of a user for a user interface (UI) navigation event based on incoming image data, wherein the initial availability state indicates a level of availability of a user's hands to perform gesture-based UI navigation; select a UI configuration and a control profile for the UI navigation event from stored customized UI configurations and control profiles of the user based on the initial availability state of the user and a context of the user; and initiate the UI navigation event based on the selected UI configuration and the control profile, wherein content is displayed in a virtual UI of the smart glasses according to the UI configuration, and UI navigation by the user is controlled based on the control profile.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
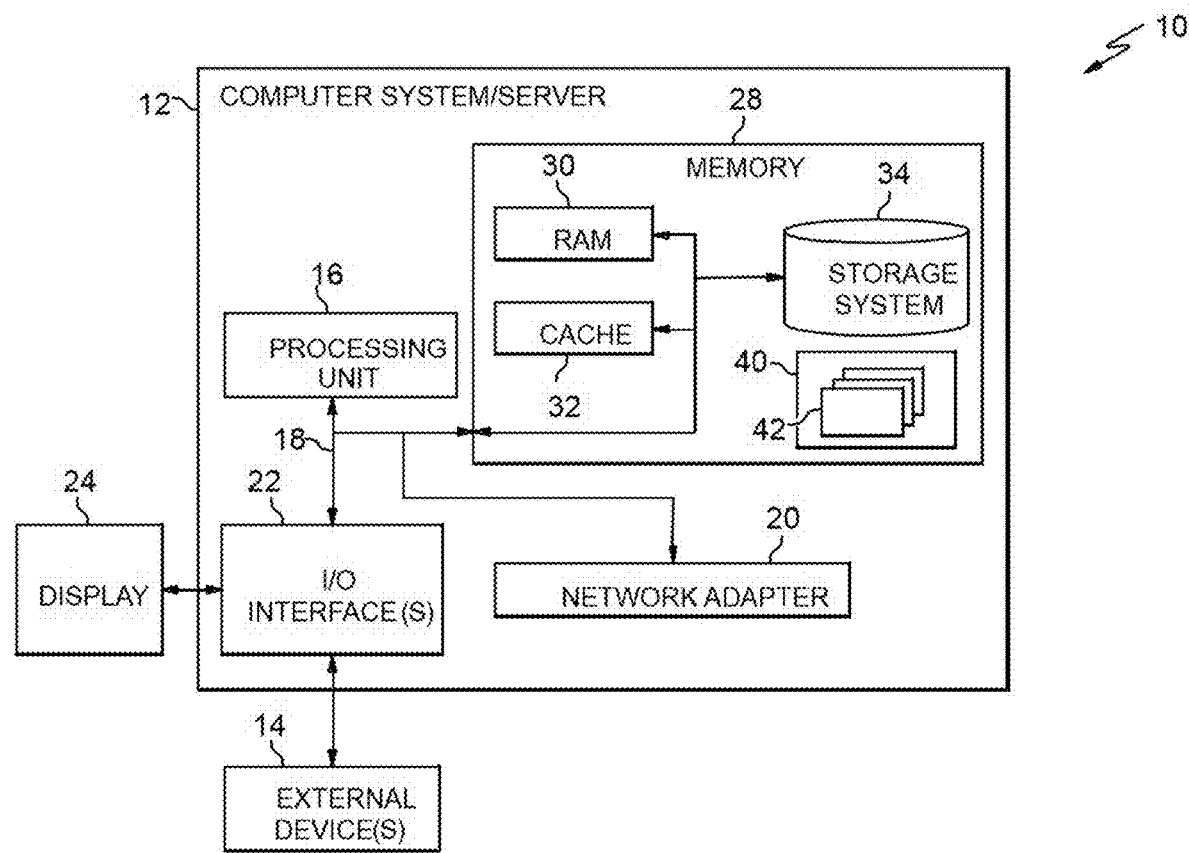
FIG. 1 depicts a cloud computing node according to an embodiment of the present invention.

Aspects of the present invention relate generally user interfaces (UI) and, more particularly, to a dynamic UI input system for smart glasses based on availability states of a user. Embodiments of the invention provide a responsive input system for an adaptive UI of a pair of smart glasses. In implementations, systems and methods of the invention allow for dynamic changes to a virtual UI (e.g., an augmented reality (AR) UI) and navigations rules associated with the virtual UI based on the availability of a user's hands and/or fingers to perform gesture-based navigation of the virtual UI.

A user's comfort while navigating an AR device depends on various factors, such as the availability of the user's hands for gesture-based navigation of a user interface, and the user's posture, etc., which can change dynamically during the course of a navigation session. For example, when a user's right hand is engaged, the user may only be able to navigate with the user's left hand, or may not be able to utilize gesture-based navigation for a period of time when both hands are engaged.

Embodiments of the invention provide smart glasses and methods of use enabling dynamic UI configuration and control functions based on the availability of a user's hand to perform gesture-based navigation and command tasks. In implementations, a smart glasses system utilizes a user's personalized navigational comfort parameters (e.g., comfort utilizing a right hand versus comfort utilizing a left hand), and a user's physical condition or status in a particular environment (e.g., a user standing in a bus or train), to dynamically create a UI and control profile, so that the user can navigate the UI effectively (as an input system).

Implementations of the invention provide smart glass systems and methods that address the technical problem of performing virtual gesture-based UI navigation when a user's hands and/or fingers are unavailable. Embodiments of the invention provide new functionality enabling dynamic UI configuration and control profile implementation based on real-time digital image analysis. In aspects, control profiles are selected in real time which enable virtual navigation (e.g., gesture-based navigation) and/or navigation utilizing a connected internet of things (IoT) device based on a status of a user's hands and/or fingers and other context of the user.

In implementations, an improved smart glasses process is provided for generating a responsive input system of an adaptive user interface, the computer-implemented process including: in response to a computer prompting a user to present at least a portion of at least one hand, available to interact with the adaptive user interface, in a field of vison of a camera of smart glasses associated with the user, identifying at least a portion of a user's hand or hands using an image capture module associated with a camera; generating, by the computer, a navigation using the identified portion of the user's hand or hands; in response to prompting the user by the computer to configure actions associated with gestures including movements and actions associated with each of the identified portion of the user's hand or hands, loading a set of default preferences, by the computer, using historical learning correlated with information including location and activities associated with the user; in response to determining, by the computer, using image recognition, the identified portion of the user's hand or hands is engaged in another activity, executing at least one of a set of predetermined actions; identifying, by the computer, a velocity and ease of movements of the user to create a pattern to coordinate execution of actions displayed on the adaptive user interface; determining, by the computer, a number of components of the adaptive user interface to display together in the adaptive user interface; and adjusting the adaptive user interface, by the computer, to display the number of components of the adaptive user interface determined on a respective side of the adaptive user interface corresponding to the identified portion of the user's hand or hands.

It should be understood that, to the extent implementations of the invention collect, store, or employ personal information provided by, or obtained from, individuals (for example, smart glasses and IoT usage information), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
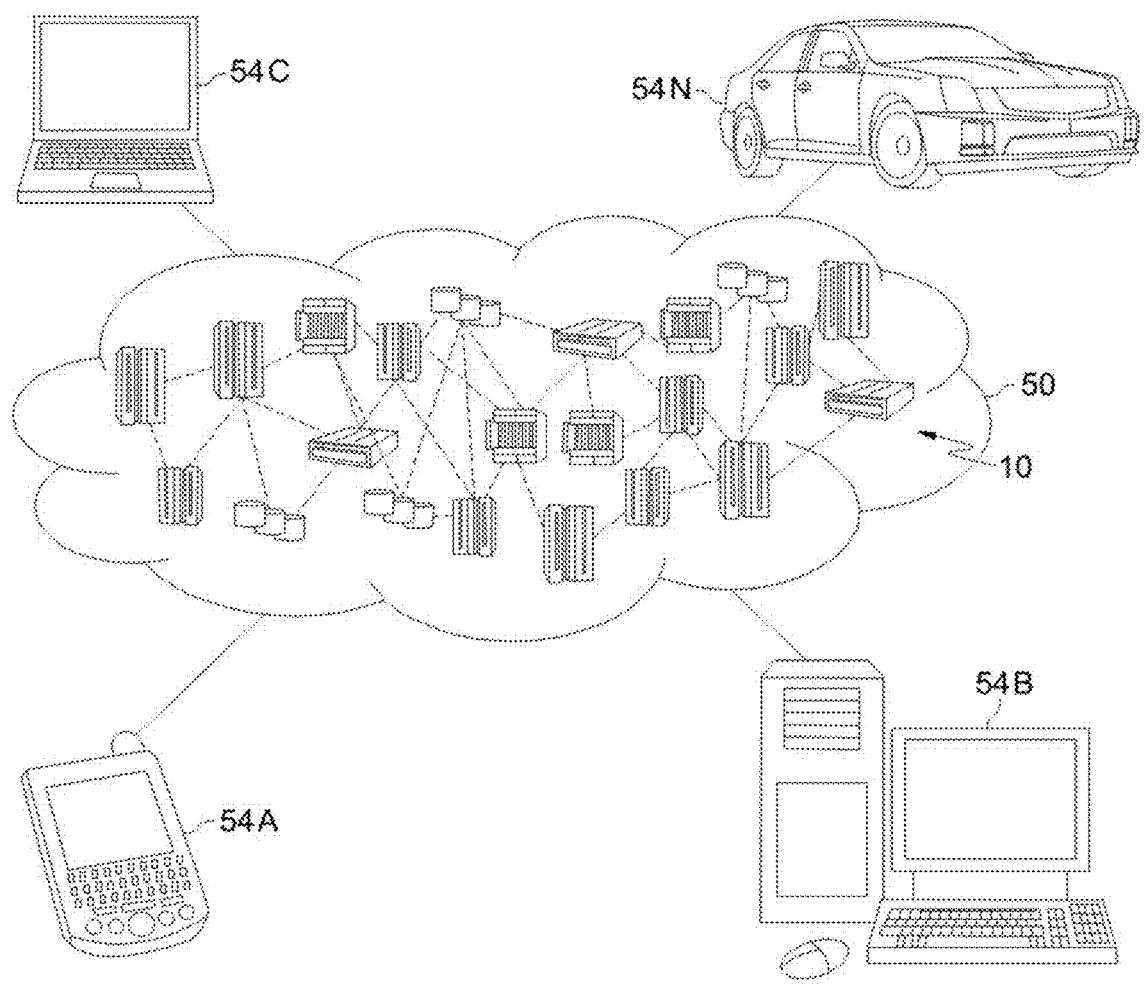
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
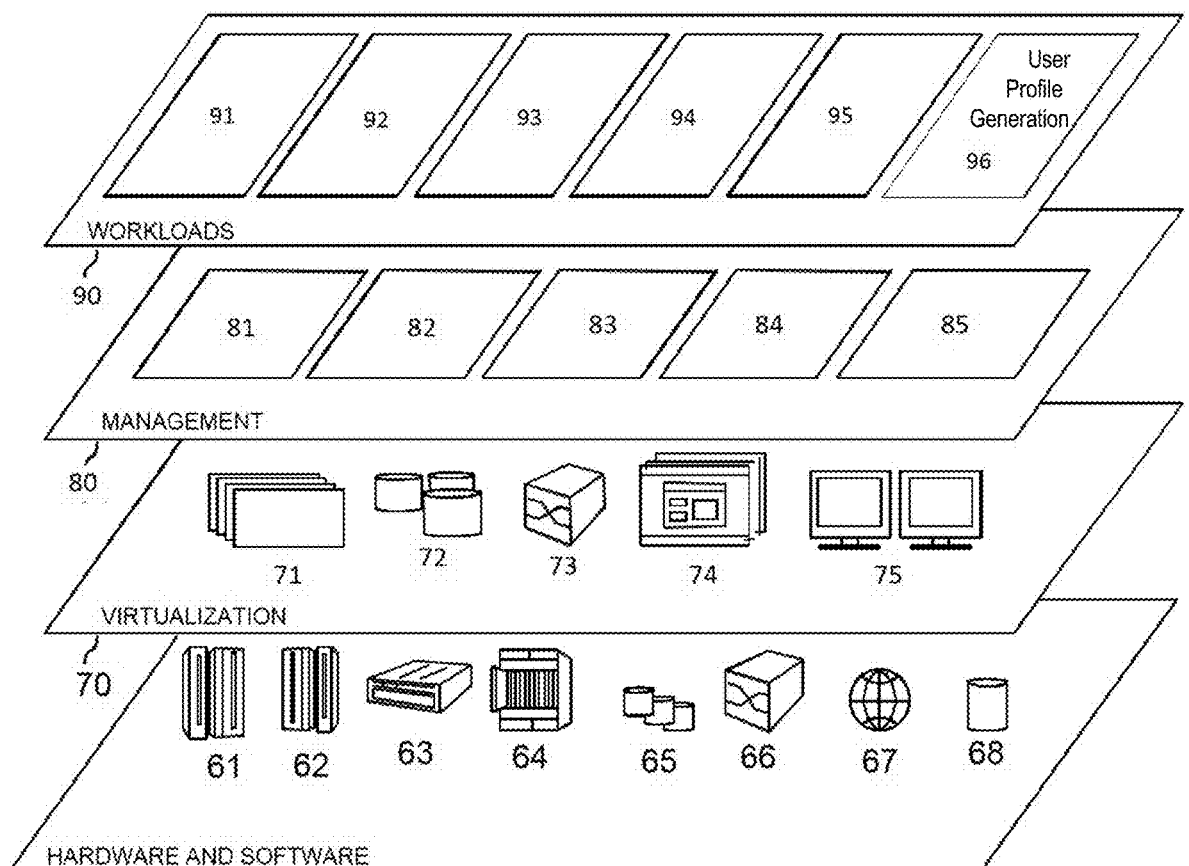
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user profile generation 96.

Implementations of the invention may include a computer system/server 12 of FIG. 1 in which one or more of the program modules 42 are configured to perform (or cause the computer system/server 12 to perform) one of more functions of the user profile generation 96 of FIG. 3. For example, the one or more of the program modules 42 may be configured to: obtain UI navigation usage data of a user of a pair of smart glasses; analyze the usage data using a machine learning algorithm to identified patterns of usage behavior of the user with respect to navigation a UI of the smart glasses; generate or update one or more UI configurations and/or control profiles of the user based on the determined patterns of usage behavior.

Figure 4:
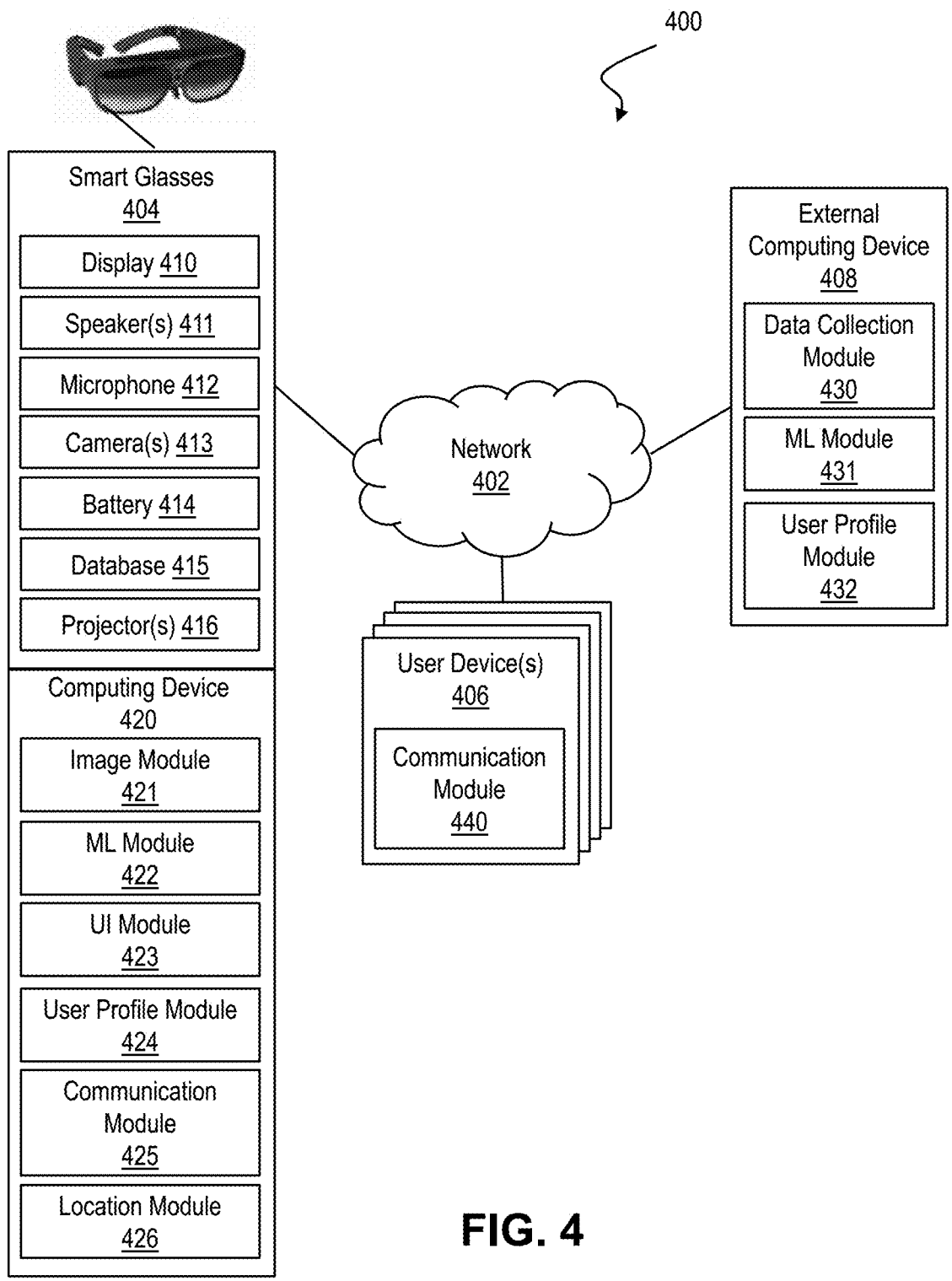
FIG. 4 shows a block diagram of an exemplary environment in accordance with aspects of the invention.

FIG. 4 shows a block diagram of an exemplary smart glasses environment 400 in accordance with aspects of the invention. In embodiments, the smart glasses environment 400 includes a network 402 enabling communication between a pair of smart glasses 404, one or more user devices 406, and an external computing device 408 (e.g., a cloud-based server).

The one or more user devices 406 and the external computing device 408 each may comprise the computer system/server 12 of FIG. 1, or elements thereof. In embodiments, the one or more user devices 406 are internet of things (IoT) devices in wireless communication with the smart glasses 404 (e.g., through a Bluetooth connection). In implementations, the smart glasses 404 and/or the one or more user devices 406 comprise local computing devices used by cloud consumers, such as, for example, the personal digital assistant (PDA) or cellular telephone 54A of FIG. 2. In such embodiments, the external computing device 408 may be a computing node 10 in the cloud computing environment 50 of FIG. 2.

The smart glasses 404 may be any type of wearable computing glasses configured to perform the methods described herein. In implementations, the smart glasses include one or more of the following: a display 410, one or more speakers 411, a microphone 412, one or more cameras 413, a battery 414, a database 415 for storing data, one or more projectors 416, and a computing device 420. In aspects of the invention, the one or more projectors 416 are configured to project images of content in a virtual UI for viewing by the user. In embodiments, a single lens or two separate lenses of the smart glasses 404 act as the display 410, wherein the one or more projectors 416 project images of content onto the display 410 for viewing by a user. Other types of image displaying methods may be utilized in accordance with methods described below, and the present invention is not indented to be limited to the type of display method discussed in examples herein. In embodiments, the smart glasses 404 provide a virtual display (e.g., via the one or more projectors 416 and the display 410) wherein a larger display image is created than is physically present. Types of virtual displays that may be utilized with the present invention include heads-up displays and virtual screens. The term heads-up display as used herein refers to a transparent display that represents data without requiring a user to look away from their usual viewpoints.

The computing device 420 of the smart glasses 404 may comprise elements of the computer system/server 12 of FIG. 1. In embodiments, the computing device 420 of the smart glasses 404 includes one or more modules, each of which may comprise one or more program modules such as program modules 42 described with respect to FIG. 1. In the example of FIG. 4, the computing device 420 of the smart glasses 404 includes one or more of the following modules: an image module 421, a machine learning (ML) module 422, an User Interface (UI) module 423, an user profile module 424, a communication module 425 and a location module 426, each of which may comprise one or more program modules 42 described with respect to FIG. 1.

In implementation, the image module 421 is configured to process image data from the one or more cameras 413 of the smart glasses 404, or image data form one or more user device 406, using image recognition methods to determine a state of availability of a user's hands and/or fingers for virtual navigation. In embodiments, the smart glasses 404 generate and store usage information regarding how a user utilizes the smart glasses 404 over time.

In implementations, the ML module 422 is configured to utilize the usage information to learn, over time, a user's patterns of behavior while using the smart glasses 404 to generate custom UI configurations and control profiles for different states of availability. The ML module 422 may also determine custom UI configurations and control profiles for different user contexts.

In embodiments, the UI module 423 is configured to display different content configurations to a user based on the state of availability of the user's hands. In implementations, the user profile module 424 stores custom control profiles for the user, and based on the state of availability of the user and context of the user, selects a stored UI configuration and control profile to utilize in a navigation event of the user, whereby the user can navigate a custom UI configuration of the user based on the select UI configuration and according to navigation rules of the control profile.

In aspects of the invention, the communication module 425 is configured to enable communication between the smart glasses 404 and the one or more user devices 406 and/or the external computing device 408 via a network connection (e.g., wireless network or Bluetooth connection). In embodiments, the communication module 425 of the smart glasses 404 enables communication with a communication module 440 (which may comprise one or more program modules 42, for example) of a user device 406, wherein the user device 406 may be an IoT device such as headphones, a smartphone, a smartwatch, etc.

In implementations of the invention, the smart glasses 404 send stored usage information to a data collection module 430 of the external computing device 408 for processing by the ML module 431. In embodiments, the ML module 431 is configured to utilize the usage information to learn, over time, a user's patterns of behavior while using the smart glasses 404 to generate custom UI configurations and control profiles for different states of availability and different user contexts. In aspects of the invention, the external computing device 408 generates and stores custom control profiles for one or more users in a user profile module 432, which is configured to provide the smart glasses 404 with the custom UI configurations and control profiles of a user. In implementations, the data collection module 430, ML module 431 and user profile module 432 of the external computing device 408 each comprise one or more computing modules 42, as described with respect to FIG. 1.

The smart glasses 404, the one or more user devices 406, and the external computing device 408 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment may include additional devices and/or networks; fewer devices and/or networks; different devices and/or networks; or differently arranged devices and/or networks than illustrated in FIG. 4.

Figure 5:
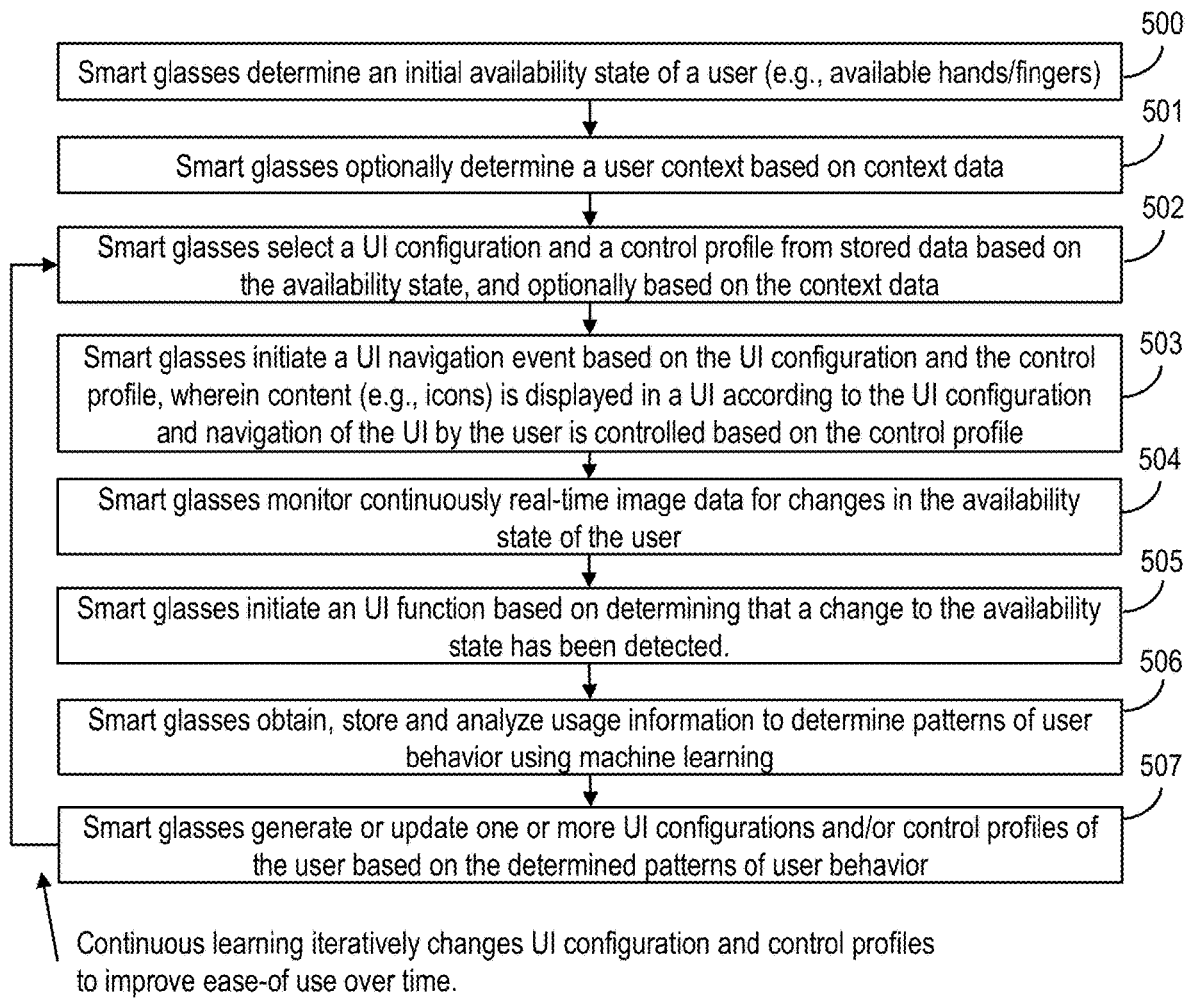
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the smart glasses 404 determine an initial availability state of a user, including the availability of a user's hands and/or fingers. The term availability state as used herein refers to a level of availability of a user's hands and/or fingers to perform gesture-based UI navigation. In implementations, the level of availability represents the ability of the user to comfortably utilize one or more fingers and/or one or more hands for gesture-based computing to navigate via a virtual UI of the smart glasses 404, based on, for example, predetermined range of motion parameters and rules. Gesture-based computing refers to interfaces where the human body interacts with digital resources without using common input devices, such as a keyboard, mouse, game controller, or voice-entry mechanism. In implementations of the invention, the smart glasses 404 are configured to recognize gestures or motions of a user's fingers and/or hands to navigate a virtual heads-up display of the smart glasses 404.

In implementations, the smart glasses 404 obtain digital image data (e.g., video or still image data) of an area(s) within a field of view of the one or more cameras 413, and analyze the digital image data using image recognition and object recognition tools and methods, such as computer vision, object classification, object detection and image segmentation. Various image processing tools and methods may be used, and the invention is not intended to be limited to the examples provided herein. In implementations, the smart glasses 404 obtain additional data (e.g., sensor data from one or more user devices 406) indicating the availability of a user's hands and/or fingers for gesture-based virtual navigation. In accordance with step 500, the smart glasses 404 may determine the initial availability state based on the image analysis, or based on a combination of the image analysis and data from the one or more user devices 406. Examples of availability states include: the left hand is available, the right hand is available, the left and the right hands are available, only some fingers of the right hand are available, and only some of the fingers of the left hand are available. Availability states may be specific (e.g., noting particular fingers that are available), may be general (e.g., noting if hands are available), or a combination thereof.

In embodiments, the smart glasses 404 present the user with instructions regarding determining the initial availability state. For example, instructions may be presented through the display 410 of the smart glasses 404 instructing the user to present one or both hands within a field of view the one or more cameras 413, or to hold up one or more fingers which the user intends to utilize during gesture-based navigation of a UI. For example, if a user intends to use both hands for one or more UI navigation tasks, the user may present both hands to the smart glasses 404. In another example, if the user wants to use three (3) fingers of the right hand for UI navigation tasks, then the user presents those three (3) fingers to the smart glasses 404. In embodiments, the image module 421 of the smart glasses 404 implements step 500.

At step 501, the smart glasses 404 determine a user context (e.g., a location or environment of the user) based on context data obtained by the smart glasses 404. The smart glasses 404 may obtain context data by analyzing image data from the one or more cameras 413, analyzing location data from the location module 426, or by analyzing data from one or more user devices 406 in communication with the smart glasses 404 (e.g., global positioning system (GPS) data, etc.), for example. In implementations of the invention, the smart glasses 404 determine a specific location (e.g., a GPS location) or a general environment (e.g., a movie theatre, driving in a car, etc.) of the user based on the context data. In embodiments, the UI module 423 of the smart glasses 404 implements step 501 by obtaining and analyzing data from one or more system components (e.g., image module 421, location module 426) or one or more connected user devices 406 (e.g., via the communication module 425).

At step 502, the smart glasses 404 select a UI configuration and a control profile of the user from stored UI configurations and control profiles based on the determined availability state of the user. The term UI configuration as used herein refers to rules or instructions regarding how content will be displayed on the UI of the smart glasses 404. The UI configuration rules or instructions may include, for example, size of content, placement of content within one or more display areas, relative placement of content, font style, color of content, etc. The term control profile as used herein refers to rules or instructions regarding gesture-based computing/navigating. In one example, an availability state of a user indicates that the user's left hand is available, the associated UI configuration indicates that a camera icon for a camera function should be displayed on the left lens of the smart glasses, and the associated control profile indicates that, after the camera icon is selected, a pinching gesture by two fingers of the left hand of the user indicates that the camera should zoom in.

In embodiments, the selection of the UI configuration and control profile of the user is further based on the context data of step 501. For example, the location or environment of the user may change the UI configuration and/or the control profile of the user, such as when the user is in a dark environment wherein the UI configuration needs to display the icons with appropriate lighting. In implementations, the UI configuration and control profile of the user are further based on what software or app has been initiated (e.g., open) by the user or is currently executing one or more tasks. For example, the UI configuration may provide instructions or rules for the display of functions of a camera app.

With continued reference to step 502, in embodiments, the smart glasses 404 (e.g., via the user profile module 424) select the UI configuration and control profile to use during a navigation event from UI configurations and control profiles mapped to different states of availability and different software, operating systems, or mobile applications (apps), which are stored in the user profile module 424 of the smart glasses 404. In alternative embodiments, the smart glasses 404 select the UI configuration and control profile to use during a navigation event from a plurality of UI configurations and control profiles based on data obtained from the external computing device 408. In this case, the smart glasses 404 may send a request to the external computing device 408 for a UI configuration and a control profile for the determined availability state of the user, and receive a response from the external computing device 408 including the UI configuration and control profile. In implementations, the UI configurations and control profiles of a user are periodically or continuously created and/or updated based on machine learning by the smart glasses 404, as will be discussed in more detail below. In embodiments, the UI module 423 of the smart glasses 404 implements step 502.

At step 503, the smart glasses 404 initiate a UI navigation event based on the UI configuration and the control profile selected at step 502, wherein content (e.g., icons) is displayed on a virtual UI of the smart glasses according to the UI configuration, and navigation of the virtual UI by the user is controlled based on the control profile of the user. In implementations, the smart glasses 503 identify available inputs (i.e., hands or fingers available for navigation, range of motions of hands or fingers, etc.) based on the availability state of the user, determine a subset of content items to display in the virtual UI (e.g., AR interface) out of available UI content items (e.g., icons) based on the ratings or scores of the UI content items, and determine where (e.g., left lens side, right lens side) to display the subset of the content items within the virtual UI based on the availability state of the user. In this way, embodiments of the invention dynamically adjust the UI (e.g., menus) to accommodate a user's available inputs. For example, the smart glasses 404 are able to show select UI content in an appropriate side of virtual UI so that a user can interact with the virtual UI in a comfortable manner. Unlike other virtual UI configurations, embodiments of the present invention do not dynamically display content on a UI based solely on the size of the UI (e.g., screen size), but instead dynamically display content in a UI based on the availability state of a user and the user's historic interaction with UI components. In embodiments, the UI module 423 of the smart glasses 404 implements step 503.

At step 504, the smart glasses 404 continuously monitor the availability state of the user for changes. In implementations, the smart glasses 404 analyze real-time image data from the one or more cameras 413 and/or data (e.g., sensor data) from one or more connected user devices 406 to determine if availability of a user's hands and/or fingers has changed from the initial availability state to a different availability state based on rules. In implementations, the smart glasses 404 recognize when a user's availability state changes from one hand available to no hands available, from two hands available to one hand available, from one hand available to one hand partially available, from two hands available to two hands unavailable, or other changes in availability states based on the availability of the user's hands and/or fingers to navigate a virtual UI of the smart glasses 404. Changes may include, for example, one or both hands leaving the field of view of the one or more cameras 413 of the smart glasses 404, or the smart glasses 404 determining that one or more objects are being held by one or more fingers or hands of the user. In embodiments, the UI module 423 implements step 504 using data from the image module 421 and/or data from the communication module 425, for example.

At step 505, the smart glasses 404 initiate a UI function based on a determination that the availability state of the user has changed. Actions that may be initiated by the smart glasses 404 include, for example, obtaining and implemented a new UI configuration and control profile based on a new availability state of the user, initiating a hold on user inputs to prevent the smart glasses 404 from acting on any detected gesture-based control commands, initiating a default UI configuration and a default control profile, and disabling gesture-based control commands detected from a compromised or unavailable hand. In one example, a user is utilizing only their right hand for gesture-based navigation. When the user grabs an object with their right hand, the smart glasses 404 will determine that the availability state of the user has changed from the right hand being available to the right hand being unavailable based on the monitoring at step 504, and the system will temporarily prevent the smart glasses 404 from implementing commands based on any movements of the right hand, thereby avoiding the implementation of undesired actions/inputs by the smart glasses 404. In embodiments, the UI module 423 of the smart glasses 404 implements step 505.

At step 506, the smart glasses 404 obtain usage information during UI navigation events, store the usage information, and analyze the usage information to determine patterns of user behavior. In an alternative embodiments, the smart glasses 404 obtain usage information during UI navigation events and send the usage information to the external computing device 408 for analysis. In this case, the data collection module 430 of the external computing device 408 obtains the usage information from the smart glasses 404, and the ML module 431 of the external computing device 408 analyzes the usage data to determine usage patterns of the user. The term usage information as used herein refers to information regarding how a user is navigating a virtual UI of the smart glasses 404, and may include which content is selected, which finger and/or hand is used for navigation commands (e.g., gesture-based commands), and a user context associated with a particular navigation event. In implementations, the usage patterns describe characteristics of the user's interactions with the UI of the smart glasses 404, such as a user's velocity during navigation of the UI (e.g., hand movement velocity), range of motion of the user's hands and/or fingers, ease of movements, etc.

In embodiments, determining the usage patterns includes scoring or rating UI content to be displayed to a user (e.g., software and app icons, app functions) based on statistics derived from the usage information. In implementations, the usage information includes statistics used by a score system to rank the importance of content to be shown on the UI of the smart glasses 404, and/or how the ranked content is to be shown to a user. Items for which the smart glasses 404 may determine usage patterns include: menu structures, time required for navigation, time required to navigate different UI components, purpose of a web page; navigational statistics such as mode of navigation used (which hand and/or finger used); IoT feed from user devices while navigation individual UI components; types of UI components; a user's mode of UI page navigation; personalized parameters; and surrounding context, for example.

In implementations, the smart glasses 404 can create a mapping between available UI content and its ratings for different availability states of the user and for different contexts of the user. For example, usage patterns may indicate that when the right hand of a user is used to navigate a UI, the user utilizes a subset of available navigation functions in a navigation application. In implementations, the smart glasses 404 will determine content to be displayed, and/or the order of content to be displayed, based on the scores or ratings meeting a threshold (e.g., top 2 rated apps will be shown) for a given context (e.g., availability state of the user, location of the user, app initiated, etc.).

At step 507, the smart glasses 404 generate or update one or more UI configurations and/or control profiles of the user based on the determined patterns of user behavior. For example, the smart glasses 404 may change the sensitivity of movements detected by the image module 421 during a navigation event based on patterns of behavior indicating the user makes large hand motions or movements. In another example, the smart glasses 404 may change a sensitivity of movements detected by the image module 421 during a navigation event based on a determined average speed or velocity of the user's hand gestures or movements. In embodiments, the ML module 422 of the smart glasses 404 implements step 507. In alternative embodiments, the UI module 423 implements step 507 based on ML data received from the ML module 431 of the external computing device 408. As indicated in FIG. 5, continuous learning by the ML module 422 of the smart glasses 404, or by the ML module 431 of the external computing device 408, allow for iterative changes to UI configurations and control profiles, which improves the ease-of-use of the smart glasses 404 over time.

Figure 6A:
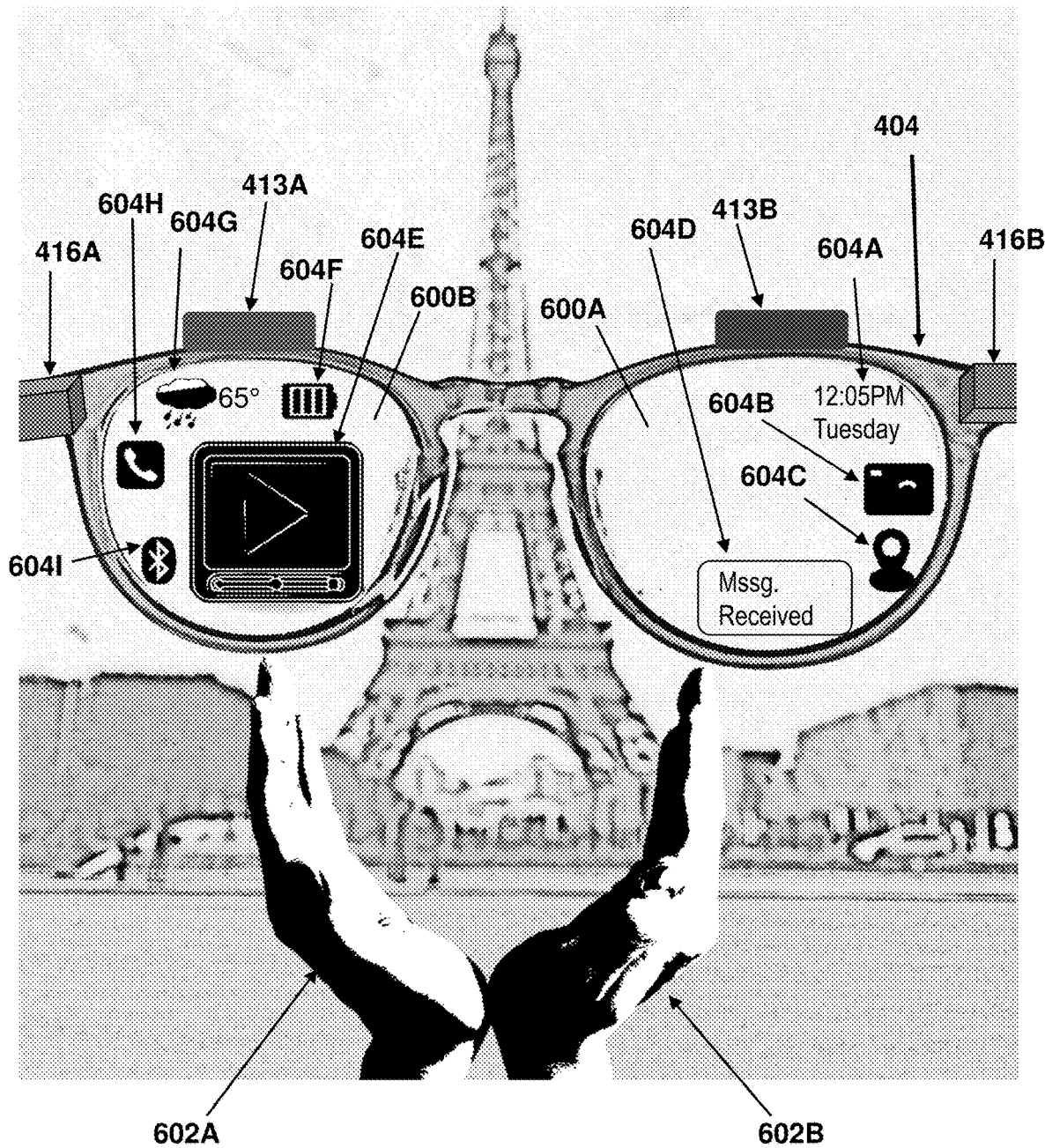
FIGS. 6A-6C illustrate exemplary use scenarios in accordance with embodiments of the invention.
Figure 6B:
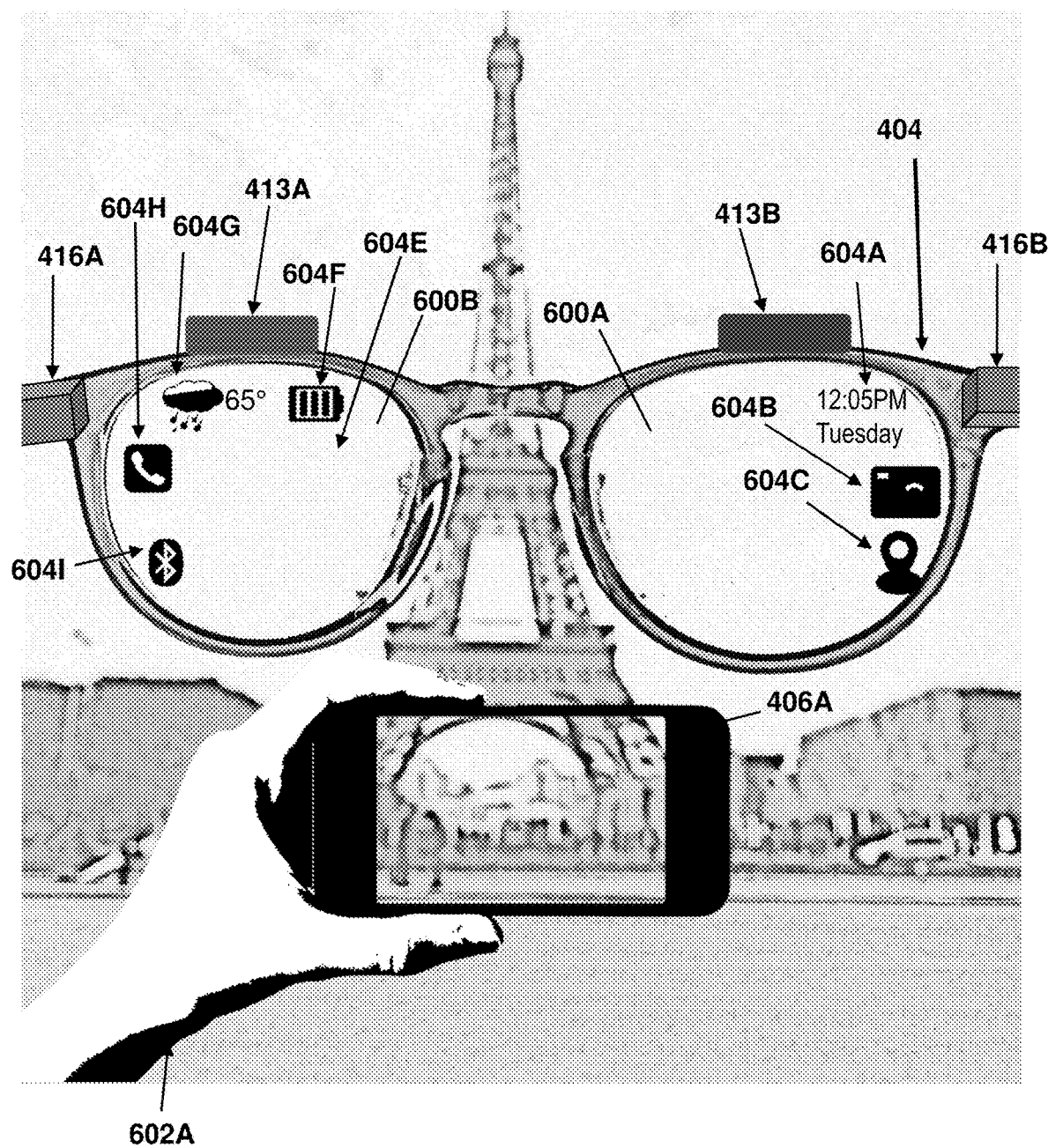
Figure 6C:
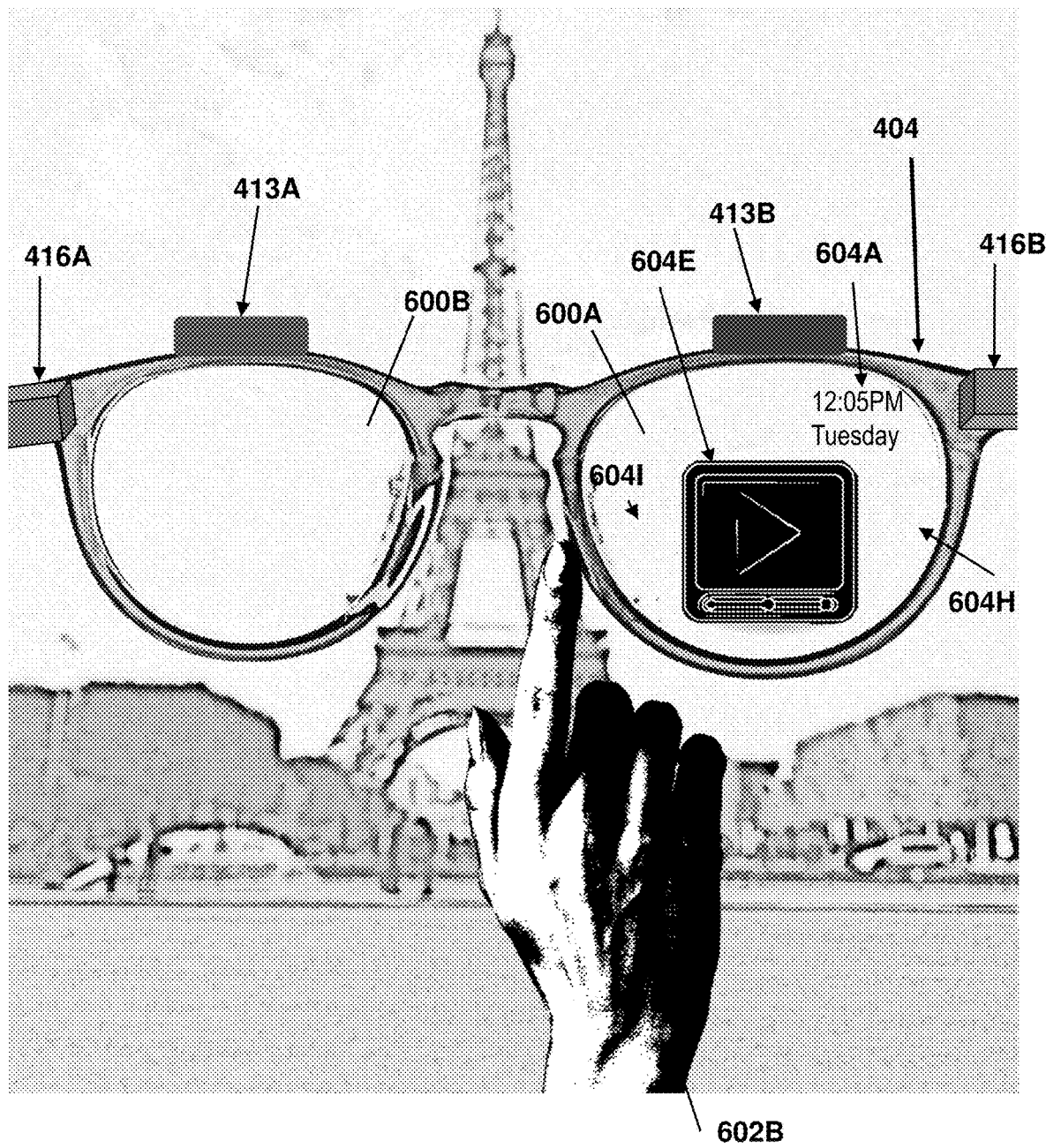

FIGS. 6A-6C illustrate exemplary use scenarios in accordance with embodiments of the invention. Steps associated with FIGS. 6A-6C may be carried out in the environment of FIG. 4 and are described with reference to elements depicted in FIG. 4.

With initial reference to FIG. 6A, a pair of smart glasses 404 are shown including projectors 416A and 416B for projecting images onto first and second lenses 600A and 600B, which constitute a display 410 of the smart glasses 404. In the example of FIG. 6A, cameras 413A, 413B provide image data to the image module 421 (shown in FIG. 4), and the image module 421 analyzes the data and determines that a user's right hand 602A and left hand 602B are within a field of view of the cameras 413A, 413B and are both empty and therefore available for navigation according to step 500 of FIG. 5. In this example, the availability state (e.g., maximum availability) indicates that both hands 602A and 602B are available for navigation.

Still referencing FIG. 6A, the smart glasses 404 select based on the availability state of the user and context of the user (e.g., the user is outside during the day) the UI configuration and control profile for a navigation event. In this example, the UI configuration displays content in both the right lens 600A display area and the left lens 600B display area according to step 502 of FIG. 5. In the example shown, a clock app 604A, a camera app 604B, a navigation app 604C and a messaging app window 604D are displayed on the right lens 600A display area according to step 503 of FIG. 5. Additionally, a video playing app 604E, a battery indicator 604F, a weather app icon 604G, a phone app 604H and a Bluetooth icon 604I, are displayed on the left lens 600B according to step 503 of FIG. 5. In this configuration, the user is free to navigate through the content shown, and once content is selected, to navigate through the next content displayed (e.g., submenu), according to step 503 of FIG. 5.

Turning to FIG. 6B, the smart glasses 404 determine that there is a change in the availability state of the user (e.g., from maximum availability to no availability/left hand engaged with smartphone), when the left hand 602A is engaged with user device 406A in communication with the smart glasses 404, and the right hand 602B is no longer within the field of view of the cameras 413A and 413B. In this case, the smart glasses 404 initiate a user interface function in accordance with step 505 of FIG. 5, wherein content is removed from the display 410 (e.g., 604D and 604E are removed) so that the user's view through the smart glasses 404 is less obstructed, and the smart glasses initiate a hold for gesture-based controls, so that the smart glasses 404 do not recognize any gesture-based controls while the smart glasses 404 remain in the same availability state (e.g., no availability/left hand engaged with smartphone).

Turning to FIG. 6C, the smart glasses 404 determine that there is a change in the availability state of the user from the maximum availability of FIG. 6A to right hand availability only. In this case, the left hand 602A is no longer within the field of view of the cameras 413A and 413B, and the entire right hand is available for navigation. As illustrated, the smart glasses 404 initiate a user interface function in accordance with step 505 of FIG. 5, wherein a new UI configuration and control profile are utilized based on the new availability state of the user. In this example, the new UI configuration and control profile cause the smart glasses 404 to leave the left lens display 600B blank, and display only the prioritized content (e.g., 604A, 604E, 604H and 604I) in the right lens display 600A. With this configuration, the smart glasses 404 recognize gesture-based control commands from the user's right hand 602B, and the user has greater ease-of use as the content on display is easily within the normal range of motion of the user's right hand.

Figure 7:
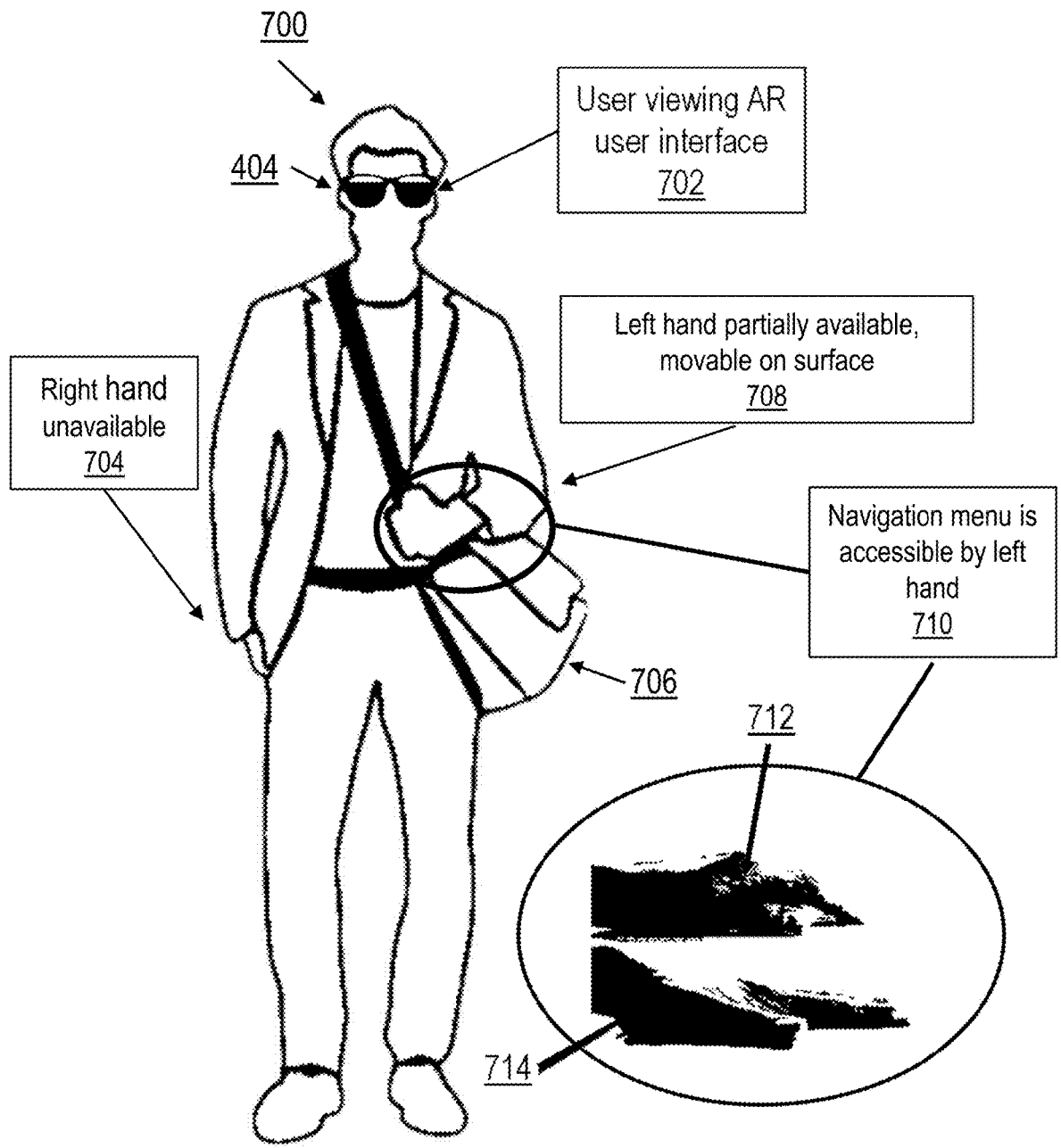
FIG. 7 illustrates another use scenario in accordance with embodiments of the invention.

FIG. 7 illustrates another use scenario in accordance with embodiments of the invention. Steps associated with FIG. 7 may be carried out in the environment of FIG. 4 and are described with reference to elements depicted in FIG. 4.

As depicted in FIG. 7, a user 700 views an augmented reality (AR) UI projected by smart glasses 404 according to step 503 of FIG. 5, as indicated at 702. The smart glasses 404 continuously monitor the availability state of the user 700 and determine at the point in time illustrated, the right hand of the user is outside of the field of view of the smart glasses 404, and is therefore unavailable, as indicated at 704. The smart glasses 404 also determine that the left hand of the user 700 is partially engaged, and the user 700 can move the left hand around on the surface of an object (i.e., bag 706), as indicated at 708. Accordingly, the smart glasses 404 initiate a UI configuration and control profile that match the availability state of the user (i.e., right hand unavailable/left hand partially available for movement on object surface). In this case, the user is enabled to navigate the AR UI by moving his left hand from a first position 712 to a second position 714 on a surface of the bag 706, for example, wherein the smart glasses 404 are enabled to interpret the movements of the left hand based on stored gesture-based control rules.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining, by a computing device of smart glasses, an initial availability state of a user's hands for a user interface (UI) navigation event based on incoming image data;
    selecting, by the computing device, a UI configuration and a control profile for the UI navigation event from stored UI configurations and control profiles of the user based on the initial availability state of the user's hands, wherein the UI configurations each comprise rules regarding how content will be displayed on the UI of the smart glasses and the control profiles each comprise rules regarding gesture-based computing and navigating; and
    initiating, by the computing device, the UI navigation event based on the selected UI configuration and the control profile, wherein application icons are displayed in a virtual UI of the smart glasses according to the UI configuration, and hand movements by the user are interpreted based on the control profile.

2. The method of claim 1, further comprising determining, by the computing device, a user context, wherein the determining the UI configuration and the control profile is further based on the determined user context.

3. The method of claim 1, wherein the virtual UI of the smart glasses comprises an augmented reality UI.

4. The method of claim 1, further comprising obtaining, by the computing device, the incoming image data from one or more cameras of the smart glasses, wherein the determining the initial availability state of the user's hands comprises analyzing the image data utilizing image recognition and object recognition.

5. The method of claim 1, further comprising:
    continuously monitoring, by the computing device, the incoming image data for a change in the initial availability state of the user;
    determining, by the computing device, a change from the initial availability state of the user to a different availability state of the user based on the monitoring; and
    initiating, by the computing device, a UI function based on the determining the change.

6. The method of claim 5, wherein the UI function is selected from at least one of the group consisting of: changing the content displayed on the virtual UI; changing the configuration of the content displayed on the virtual UI; and changing the control profile of the user, thereby changing control rules utilized by the computing device during the navigation event.

7. The method of claim 6, wherein the UI function changes a display of content by the virtual UI so that content is displayed on a side of a display of the smart glasses coinciding with an available hand of the user.

8. The method of claim 1, further comprising:
    obtaining, by the computing device, usage information of the user;
    analyzing, by the computing device, the usage information of the user utilizing a machine learning algorithm to determine patterns of user behavior; and
    storing, by the computing device, the patterns of user behavior.

9. The method of claim 8, further comprising generating customized UI configurations and control profiles of the user based on the determined patterns of user behavior, wherein the stored UI configurations and control profiles of the user are the customized UI configurations and control profiles of the user.

10. A computer program product comprising one or more computer readable storage media having program instructions collectively stored on the one or more computer readable storage media, the program instructions executable to cause a computing device of smart glasses to:
- determine an initial availability state of a user for a user interface (UI) navigation event based on incoming image data, wherein the initial availability state indicates a level of availability of a user's hands to perform gesture-based UI navigation;
- select a UI configuration and a control profile for the UI navigation event from stored customized UI configurations and control profiles of the user based on the initial availability state of the user, wherein the UI configurations each comprise rules regarding how content will be displayed on the UI of the smart glasses and the control profiles each comprise rules regarding gesture-based computing and navigating; and
- initiate the UI navigation event based on the selected UI configuration and the control profile, wherein application icons are displayed in a virtual UI of the smart glasses according to the UI configuration, and hand movements by the user are interpreted based on the control profile.

11. The computer program product of claim 10, wherein the program instructions are further executable to cause the computing device of the smart glasses to determine a user context, wherein the determining the UI configuration and the control profile is further based on the determined user context.

12. The computer program product of claim 10, wherein the program instructions are further executable to cause the computing device of the smart glasses to obtain the incoming image data from one or more cameras of the smart glasses, wherein the determining the initial availability state of the user comprises analyzing the image data utilizing image recognition and object recognition.

13. The computer program product of claim 10, wherein the program instructions are further executable to cause the computing device of the smart glasses to:
- continuously monitor the incoming image data for a change in the initial availability state of the user;
- determine a change from the initial availability state of the user to a different availability state of the user based on the monitoring; and
- initiate a UI function based on the determining the change.

14. The computer program product of claim 13, wherein the UI function is selected from at least one of the group consisting of: changing the content displayed on the virtual UI; changing the configuration of the content displayed on the virtual UI; and changing the control profile of the user, thereby changing control rules utilized by the computing device during the navigation event.

15. The computer program product of claim 14, wherein the UI function changes a display of content by the virtual UI so that content is displayed on a side of a display of the smart glasses coinciding with an available hand of the user.

16. The computer program product of claim 10, wherein the program instructions are further executable to cause the computing device of the smart glasses to:
- obtain usage information of the user;
- analyze the usage information of the user utilizing a machine learning algorithm to determine patterns of user behavior; and
- generate the customized UI configurations and control profiles of the user based on the determined patterns of user behavior.

17. A system comprising:
a processor, a computer readable memory, one or more computer readable storage media, and program instructions collectively stored on the one or more computer readable storage media, the program instructions executable to cause a computing device of smart glasses to:
- determine an initial availability state of a user for a user interface (UI) navigation event based on incoming image data, wherein the initial availability state indicates a level of availability of a user's hands to perform gesture-based UI navigation;
- select a UI configuration and a control profile for the UI navigation event from stored customized UI configurations and control profiles of the user based on the initial availability state of the user and a context of the user, wherein the UI configurations each comprise rules regarding how content will be displayed on the UI of the smart glasses and the control profiles each comprise rules regarding gesture-based computing and navigating; and
- initiate the UI navigation event based on the selected UI configuration and the control profile, wherein application icons are displayed in a virtual UI of the smart glasses according to the UI configuration, and hand movements by the user are interpreted based on the control profile.

18. The system of claim 17, wherein the program instructions are further executable to cause the computing device of the smart glasses to:
- continuously monitor incoming image data to determine a change in the initial availability state of the user;
- determine a change from the initial availability state of the user to a different availability state of the user based on the monitoring; and
- initiate a UI function based on the determining the change, wherein the UI function is selected from at least one of the group consisting of: changing the content displayed on the virtual UI; changing the configuration of the content displayed on the virtual UI; and changing the control profile of the user, thereby changing control rules utilized by the computing device during the navigation event.

19. The system of claim 18, wherein the UI function changes a display of content by the virtual UI so that content is displayed on a side of a display of the smart glasses coinciding with an available hand of the user.

20. The system of claim 17, wherein the program instructions are further executable to cause the computing device of the smart glasses to:
- obtain usage information of the user;
- analyze the usage information of the user utilizing a machine learning algorithm to determine patterns of user behavior; and
- generate the customized UI configurations and control profiles of the user based on the determined patterns of user behavior.

* * * * *